US012505600B2

(12) United States Patent
Small et al.

(10) Patent No.: US 12,505,600 B2
(45) Date of Patent: Dec. 23, 2025

(54) GAMING AVATARS BASED ON AGGREGATED INFORMATION ACROSS METAVERSE PLATFORMS

(71) Applicant: IGT, Las Vegas, NV (US)

(72) Inventors: David Small, Moncton (CA); Jackie Alvarez, Las Vegas, NV (US); Karen Van Niekerk, Dieppe (CA); Gaurav Jariwala, Halifax (CA); Daniel Landry, Moncton (CA); Bethany Plimmer, Lower Coverdale (CA); Todd Grimm, Riverview (CA)

(73) Assignee: IGT, Las Vegas, NV (US)

( * ) Notice: Subject to any disclaimer, the term of this patent is extended or adjusted under 35 U.S.C. 154(b) by 125 days.

(21) Appl. No.: 18/592,768

(22) Filed: Mar. 1, 2024

(65) Prior Publication Data

US 2025/0278882 A1    Sep. 4, 2025

(51) Int. Cl.
*G06T 13/40*    (2011.01)
*G06F 3/01*    (2006.01)
*G06T 19/00*    (2011.01)
*G07F 17/32*    (2006.01)

(52) U.S. Cl.
CPC ............. *G06T 13/40* (2013.01); *G06F 3/011* (2013.01); *G06T 19/006* (2013.01); *G07F 17/323* (2013.01); *G07F 17/3239* (2013.01)

(58) Field of Classification Search
None
See application file for complete search history.

(56) References Cited

U.S. PATENT DOCUMENTS

| | | | |
|---|---|---|---|
| 8,147,334 B2 | 4/2012 | Gatto et al. | |
| 8,764,566 B2 | 7/2014 | Miltenberger et al. | |
| 2009/0319609 A1* | 12/2009 | Ferraro | G06F 3/011 709/204 |
| 2015/0142142 A1* | 5/2015 | Campana | G06Q 10/0639 700/91 |
| 2020/0206637 A1* | 7/2020 | Robbins | G06F 16/903 |
| 2022/0309270 A1* | 9/2022 | Small | G06V 40/103 |

* cited by examiner

*Primary Examiner* — Tapas Mazumder
(74) *Attorney, Agent, or Firm* — Sheridan Ross P.C.

(57) ABSTRACT

Embodiments of the present disclosure are directed to artificially intelligent player avatars in a virtual casino. Generally speaking, various types of information related to a player can be collected and aggregated across a number of different real world and virtual reality sources. This aggregated data can be used to generate a player model. Similarly, information can be collected about one or more electronic games and this information can be used to generate a game model for each game. An avatar can then be generated and presented in a virtual reality gaming venue, e.g., a virtual casino. This avatar can then interact with the play based on the player model and the game model.

20 Claims, 5 Drawing Sheets

GAMING AVATARS BASED ON AGGREGATED INFORMATION ACROSS METAVERSE PLATFORMS

BACKGROUND

The present disclosure is generally directed to operating a virtual casino and, in particular, to using artificially intelligent player avatars based on information collected and aggregated across a number of sources.

Virtual reality systems allow remote users to interact with a virtual reality environment. One example of a virtual reality environment is a virtual casinos through which players can experience the atmosphere of a casino remotely. In a virtual reality environment, players, other users, and automated bots can be represented by avatars. There is a need in the art for improved methods and system for presenting such avatars and interacting with players or other users in a way that is tailored to the player of user.

BRIEF SUMMARY

Embodiments of the present disclosure are directed to artificially intelligent player avatars in a virtual casino. According to one embodiment, a method for operating a virtual reality gaming environment can comprise aggregating, from a plurality of sources, player information for a player of a virtual game in the virtual reality gaming environment. The plurality of sources can comprise, for example, a gaming channel, a metaverse, such as a third-party metaverse, etc. A player model can be trained based on the aggregated player information for the player. The player model can represent preferences and behaviors for the player.

Game play information for the virtual game can also be aggregated. A game model can be trained based on the aggregated game play information. The game model can represent results of execution of the virtual game.

An avatar can be presented in the virtual reality gaming environment. In some cases, the avatar can be based on a set of player selections. The player can be interacted with in the virtual reality gaming environment through the avatar based on the player model and the game model while the player is playing the virtual game. For example, interacting with the player in the virtual reality gaming environment through the avatar can comprise conducting a two-way communication with the player. The two-way communication with the player can comprise, for example, asking the player a question. The player model can be further trained based on the interacting with the player in the virtual reality gaming environment through the avatar.

According to another embodiment, a virtual reality system can comprise a processor and a memory coupled with and readable by the processor. The memory can store therein a set of instructions which, when executed by the processor, causes the processor to aggregate, from a plurality of sources, player information for a player of a virtual game in the virtual reality gaming environment and train a player model based on the aggregated player information for the player. The player model can represent preferences and behaviors for the player.

The instructions can further cause the processor to aggregate game play information for the virtual game and train a game model based on the aggregated game play information. The game model can represent results of execution of the virtual game.

The instructions can further cause the processor to present an avatar in the virtual reality gaming environment and interact with the player in the virtual reality gaming environment through the avatar based on the player model and the game model while the player is playing the virtual game.

For example, interacting with the player in the virtual reality environment through the avatar can comprise providing advice to the player. In such cases, the advice to the player can comprise, for example, advice related to game strategy for the virtual game. In some cases, the player information can comprise biometric information for the player while playing the virtual game. The biometric information for the player can indicate an emotional state for the player. In such cases, the player can comprise responsible gaming advice based on the indicated emotional state for the player.

According to another embodiment, a gaming system can comprise a processor and a memory coupled with and readable by the processor. The memory can store therein a set of instructions which, when executed by the processor, causes the processor to aggregate, from a plurality of sources, player information for a player of a virtual game in the virtual reality gaming environment, train a player model based on the aggregated player information for the player. The player model can represent preferences and behaviors for the player. The instructions can further cause the processor to aggregate game play information for the virtual game, train a game model based on the aggregated game play information. The game model representing results of execution of the virtual game.

The instructions can further cause the processor to present an avatar in the virtual reality gaming environment and interact with the player in the virtual reality gaming environment through the avatar based on the player model and the game model while the player is playing the virtual game. In some cases, the instructions can further cause the processor to update the avatar based on activity of the player in the virtual gaming environment. For example, presenting the avatar can further comprise playing the virtual game by the avatar based on the player model. In some cases, the plurality of sources can comprise a third-party platform and the avatar can comprise a cross-platform avatar. Additionally, or alternatively, interacting with the player in the virtual reality gaming environment through the avatar can comprise providing a plurality of functions through the avatar. In some cases, the instructions can additionally, or alternatively, cause the gaming system to track activity of the player in real life and update the avatar based on the activity of the player in real life.

Additional features and advantages are described herein and will be apparent from the following Description and the figures.

DETAILED DESCRIPTION

Embodiments of the present disclosure are directed to artificially intelligent player avatars in a virtual casino. Generally speaking, various types of information related to a player can be collected and aggregated across a number of different real world and virtual reality sources. This aggregated data can be used to generate a player model. Similarly, information can be collected about one or more electronic games and this information can be used to generate a game model for each game. An avatar can then be generated and presented in a virtual reality gaming venue, e.g., a virtual casino. This avatar can then interact with the play based on the player model and the game model. Such avatars can provide a bridge between various gaming platforms, e.g., real-life casinos and Video Lottery Terminals (VLT), online games, sports betting, future metaverse gaming environments, and/or others.

In addition to simply being an animated character, the avatar can be an Artificial Intelligence (AI) agent or intelligent avatar that can learn a player's various behaviors in each of the platforms through machine learning training based on the player's accumulated game play data within each platform. The avatar can then also become a virtual partner that provides real-time recommendations to the player within each of the channels on best practices or previous actions that the player took in similar circumstances. An intelligent avatar agent can then be instructed to operate autonomously within predefined constraints or can carry out specific instructions as provided by the player. The player could also query the avatar for advice during a game. Once the avatar understands the motivations of the player and is trained in this manner, the avatar could transmit "simulated emotions" to the player as it is playing the game. This would heighten the excitement level of the player as the avatar plays.

Figure 1:
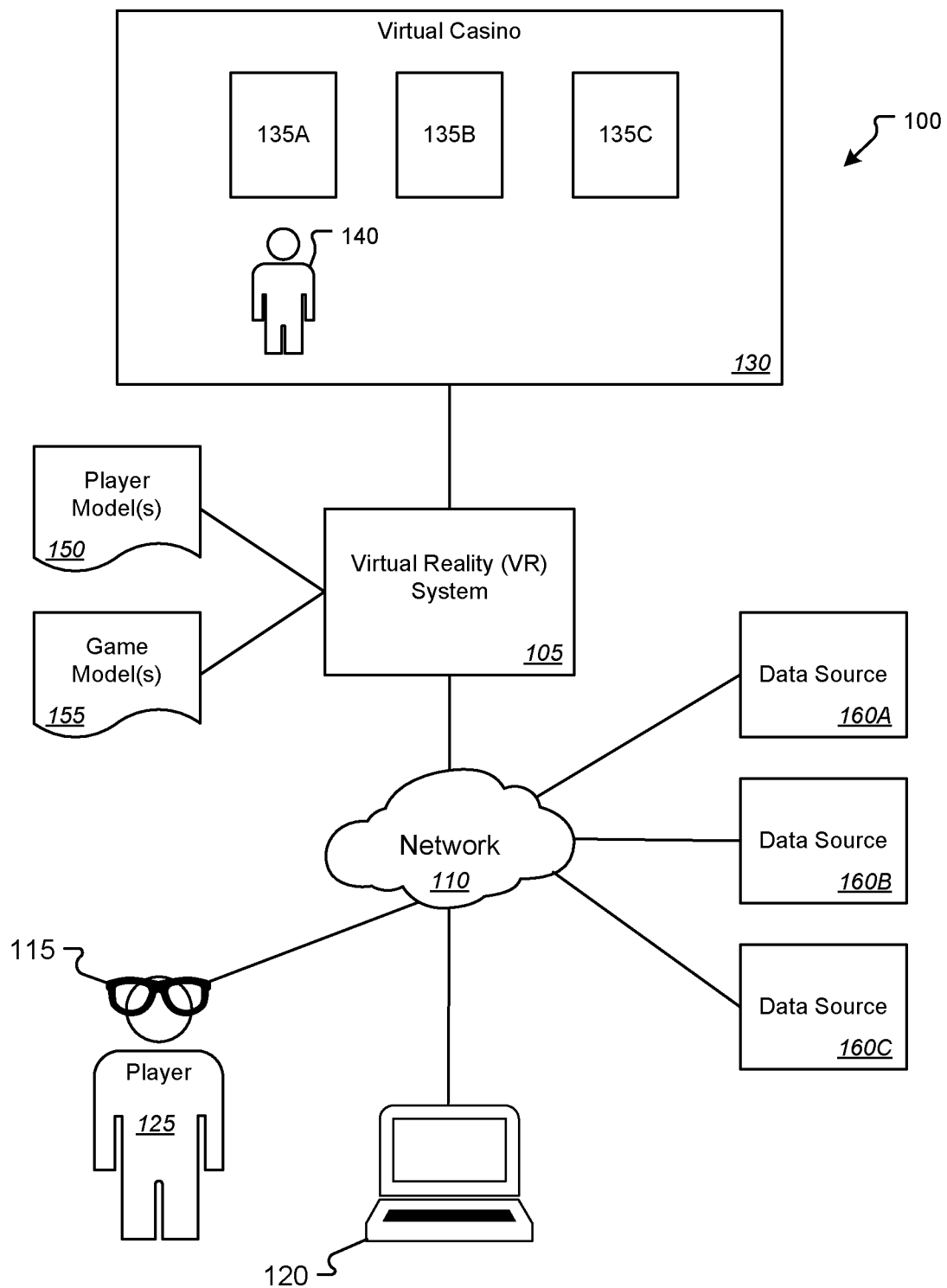
FIG. 1 is a diagram illustrating an exemplary environment in which embodiments of the present disclosure may be implemented.

FIG. 1 is a diagram illustrating an exemplary environment in which embodiments of the present disclosure may be implemented. As illustrated in this example, the environment 100 can include a VR system 105 communicatively coupled with a communications network 110. The communications network 110 can comprise any one or more wired and/or wireless local area and/or wide area networks as known in the art including, but not limited to, the Internet. Also coupled with the communications network 110 can be any number of VR user devices 115 and 120 such a wearable headset, glasses, etc., a mobile device such as a smartphone, tablet, personal computer, etc. as known in the art.

Through the VR devices 115 and 120, the VR system 105 can provide to a player 125 a representation of a virtual casino 130. The virtual casino 130 can comprise one or more virtual Electronic Gaming Machines (EGMs) or other virtual gaming systems 135A-135C. Through one of the VR devices 115 or 120, the player can access and play one or more of the virtual games 135A-135C in the virtual casino 130.

As introduced above, the VR system 105 can also collect and aggregate various types of information related to a player 125 across a number of different real world and virtual reality sources 160A-160C. This aggregated data can be used to generate, i.e., train, a player model 150. Similarly, the VR system 105 can collect information about one or more electronic games and this information can be used to generate, i.e., train, a game model 155 for each game. An avatar 140 can then be generated and presented in a virtual reality gaming venue, e.g., a virtual casino 130. This avatar 140 can then interact with the player 125 based on the player model 150 and the game model 155.

The avatar 140 can accumulate knowledge of how the player 122 responds to various game conditions and can log the outcome of the various decisions made by the player over time. This knowledge can be applied to the math of the specific game 135A the player 125 is playing and provide informed advice to the player 125 on the various play options available to him. Game math can be quite complex, and many players do not understand it well enough to make informed decisions. The avatar 140 can do this for them by playing the game 135A on their behalf or by providing recommendations to the player 125 in real time. For example, the avatar 140 can inform the player 125 how to wager in order to optimize playing time, or higher volatility play, or the avatar 140 can play on behalf of the player in these manners.

In effect, the avatar 140 can train the player 125 on how to play so that each player 125 can enjoy his optimum playing experience. This can also apply to responsible gaming related behaviors to identify these circumstances and/or bring them to the attention of the player 125 or to gradually divert the player 125 from these undesirable conditions. According to one embodiment, the avatar 140 can query the player 125 on how they are enjoying the play session in order for the AI of the VR system 105 to optimize the reward function for that specific player 125.

According to one embodiment, avatars can be used to provide experiences. For example, themed games of famous movies, tv series, or stories, where the player's avatar 140 is one of the characters and can acquire different assets with different powers, e.g., like wands in Harry Potter.

According to one embodiment, instead of creating or owning an avatar 140, a player 125 can rent an avatar 140 or be given/awarded use of an avatar 140. For example, in the virtual casino 130 context, pre-built characters can be maintained that can be comped to players or that players can rent, or that can be awarded temporarily based on bets, level of play, or monies spent. Then a player with a proper account can be a high roller for a night/day without having to invest time in creating a player character or even an account in the virtual casino 130.

Additionally, or alternatively, the avatar 140 can act as an intelligent advisor for the player 125 that provides real time recommendations to the player 125 within in each of the channels on best practices or previous actions that the player 125 took in similar circumstances. These recommendations can also factor in the math table of each game and suggest optimized actions on a per-game basis. For example, the avatar 140 can make suggestions of optimal strategy or act as advisory based on previous play decisions. Additionally, or alternatively, the avatar's 140 recommendations can apply to responsible gaming related behaviors to identify these circumstances and/or bring them to the attention of the player 125 or to gradually divert the player 125 from these undesirable conditions. In some cases, the avatar 140 can carry on a two-way communication with the player 125 and query the player 125 on how they enjoyed the play experience, via voice or text.

According to one embodiment, the avatar 140 can collect emotional feedback to the player 125. As the avatar 140 plays on behalf of the player 125, it can identify the emotions that the player 125 would have felt if he was playing himself and transmit those emotions via a bio-feedback mechanism to the player 125. The emotions can be determined by the historical input that the avatar 140 has collected from the player 125.

In some cases, the avatar 140 can be updated based on activity of the player 125 in the virtual casino 130. For example, the avatar 140 can receive skins or outfits, etc. In another example, the avatar can be updated to have the appearance of a game character, particular person, e.g., famous person or influencer, etc. In yet another example of updating an avatar, an indication can be provided as to whether the avatar represents a human player or automated process.

Additionally, or alternatively, the avatar 140 can play the virtual game 135A based on the player model 150. That is, according to one embodiment, the avatar 140 can play game(s) for the player in a virtual casino 130, for example, based on the player model 150, game model 155, parameters, and limits set up by the player 125. The avatar 140 can represent an AI agent or bot that has been trained on the user's game play style, using the user's historical game play data as a training set. In some cases, the avatar 140 can provide an autoplay strategy for the player 125 and uses the player model 150 and characteristics to build and execute the autoplay strategy. Additionally, or alternatively, the avatar 140 can query the player 125 during or after a play session to determine the player's level of satisfaction or dissatisfaction and use this to enhance the player model 150 and reward function.

Additionally, or alternatively, interacting with the player in the virtual reality gaming environment through the avatar can comprise providing a plurality of functions through the avatar. For example, a player's avatar 140 can be a fungible token that becomes a non-fungible token. In such an example, the player 125 can collect "flair" from winning certain XTB (times total bet) amounts. In another example, the avatar 140 can provide the player 125 with real in-game feelings through brain stimulation. That is, the avatar 140 can provide, e.g., through the player's VR headset 115, brain stimulation to influence the players emotions by one or more of various non-invasive and invasive techniques and technologies including electrical, magnetic, radiowave, and visual or auditory cues. By knowing the players state of mind during the game based on the avatars training and knowing the state of the game, the avatar can decide which emotion should be induced in the player in order to provide optimum satisfaction. These brain stimulation techniques are routinely used in the medical field to alter brain functions and could therefore be adapted to work in an entertainment mode. They could also be used in a responsible gaming mode. Electrical devices can include simple wire electrode implants or implanted chips with RF interfaces. Both of these technologies are invasive, but the implant option may become more mainstream and practical in the future. Transcranial Magnetic Stimulation (TMS) uses magnetic fields to stimulate nerve cells in the brain to modify brain functions. A non-invasive magnetic pulse emitter device can be embedded in the players chair and provide stimulation without physical contact with the player. In a similar fashion to magnetic devices, Temporal Interference Stimulation (TIS) stimulates the brain with high frequency radio waves via a small antenna embedded in the player's chair. Visual and auditory cues, subliminal or otherwise, can be used to induce various psychological effects via speakers and screen.

In some cases, the VR system 105 can track 520 activity of the player in real life and update the avatar based on the activity of the player in real life. For example, a mobile device of the player can be used to track day to day activities which then influences the progression and type of progression of an avatar or charm. For example, the types of activities tracked can include, but are not limited to, locations visited, activities occurring at those locations, browsing histories, etc.

Figure 2:
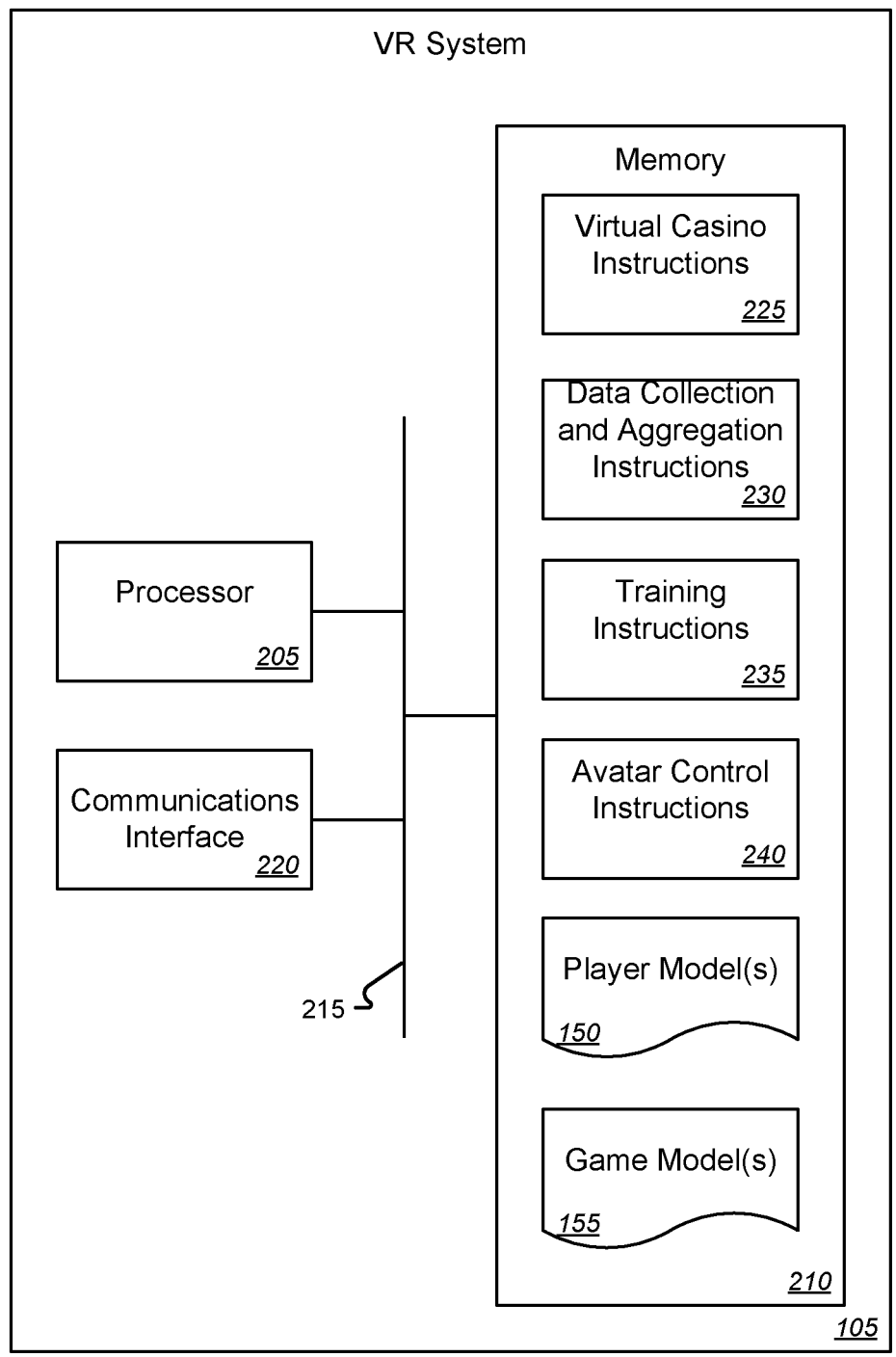
FIG. 2 is a block diagram illustrating additional details of components of an exemplary virtual reality system according to one embodiment of the present disclosure.

FIG. 2 is a block diagram illustrating additional details of components of an exemplary virtual reality system according to one embodiment of the present disclosure. As illustrated in this example, the VR system 105 can comprise a processor 205. The processor 205 may correspond to one or many computer processing devices. For instance, the processor 205 may be provided as silicon, as a Field Programmable Gate Array (FPGA), an Application-Specific Integrated Circuit (ASIC), any other type of Integrated Circuit (IC) chip, a collection of IC chips, or the like. As a more specific example, the processor 205 may be provided as a microprocessor, Central Processing Unit (CPU), or plurality of microprocessors that are configured to execute the instructions sets stored in a memory 210. Upon executing the instruction sets stored in memory 210, the processor 205 enables various functions of the VR system 105 as described herein.

The memory 210 can be coupled with and readable by the processor 205 via a communications bus 215. The memory 210 may include any type of computer memory device or collection of computer memory devices. Non-limiting examples of memory 210 include Random Access Memory (RAM), Read Only Memory (ROM), flash memory, Electronically-Erasable Programmable ROM (EEPROM), Dynamic RAM (DRAM), etc. The memory 210 may be configured to store the instruction sets depicted in addition to temporarily storing data for the processor 205 to execute various types of routines or functions.

The processor 205 can also be coupled with one or more communications interfaces 220. The communication interfaces 220 can comprise, for example, Ethernet, Bluetooth, WiFi, or other type of wired or wireless communications interfaces.

The memory 210 can store therein a set of virtual casino instructions 225 which, when executed by the processor 205, causes the processor 205 to provide, via the communications interface 220, to a plurality of user devices 115 and 120, a representation of the virtual casino 130. The virtual casino instructions 225 can cause the processor 205 to execute an electronic game within the virtual casino 130 and provide a representation of the electronic game, e.g., as a virtual EGM of other virtual gaming system 135A, to a user device 115 or 120.

The memory 210 can also have stored therein a set of data collection and aggregation instructions 230 which, when executed by the processor 205, can cause the processor 205 to aggregate, from a plurality of sources 160A-160C, player information for a player 125 of a virtual game in the virtual casino 130. The plurality of sources 160A-160C can comprise any of a number of real and/or virtual sources including a real or virtual gaming channel, one or more different metaverses which can include one or more third-party metaverses, and/or other sources of information about the player 125, including but not limited to the player's preferences, past and current activities in real-life and/or in one or more virtual environments, etc. The memory 210 can also have stored therein a set of training instructions 235. The training instructions 235, when executed by the processor 205, can cause the processor 205 to train a player model 150 based on the aggregated player information for the player 125. The player model 150 can represent preferences and behaviors for the player 125.

The data collection and aggregation instructions 230 can further cause the processor 205 to collect and aggregate game play information for a virtual game. This game play information can be obtained and aggregated from games in a real or virtual casino 130 while the game, or a similar game, is being played. The training instructions 235 can further cause the processor 205 to train a game model 155 on the aggregated game play information. The game model 155 can represent the operation or progress of the virtual game while it is being played and results of execution of the virtual game.

The memory 210 can further comprise a set of avatar control instructions 240. When executed by the processor 205, the avatar control instructions 240 can cause the processor 205 to present an avatar 140 in the virtual reality gaming environment such as the virtual casino 130. In some cases, the avatar 140 can be generated and presented based on a set of player selections, predefined preferences, and/or preferences represented in the player model 150. Additional details of exemplary processes that can be performed in conjunction with presenting the avatar will be described below with reference to FIG. 5.

The avatar control instructions 240 can further cause the processor 205 to conduct interactions with the player 125 in the virtual casino 130 through the avatar 140, for example, while the player 125 is playing the virtual game. These interactions can be based on the player model 150 and the game model 155. Additional details of exemplary processes which may be performed in conjunction with conducting these interactions will be described below with reference to FIG. 4.

Figure 3:
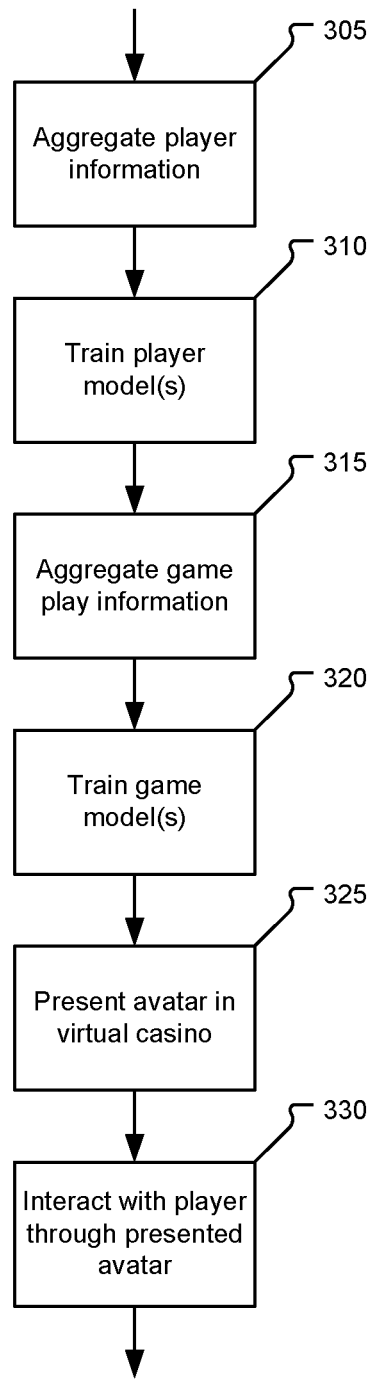
FIG. 3 is a flowchart illustrating an exemplary process for operating a virtual reality gaming environment according to one embodiment of the present disclosure.

FIG. 3 is a flowchart illustrating an exemplary process for operating a virtual reality gaming environment according to one embodiment of the present disclosure. As illustrated in this example, operating a virtual reality gaming environment such as a virtual casino 130 as described above can comprise aggregating 305, from a plurality of sources 160A-160C, player information for a player 125 of a virtual game in the virtual reality gaming environment. The plurality of sources can comprise any of a number of real and/or virtual sources including a real or virtual gaming channel, one or more different metaverses which can include one or more third-party metaverses, and/or other sources of information about the player 235, including but not limited to the player's preferences, past and current activities in real-life and/or in one or more virtual environments, etc. A player model can then be trained 310 based on the aggregated 305 player information for the player. The player model can represent preferences and behaviors for the player 125.

Game play information for a virtual game can also be aggregated 315. This game play information can be obtained and aggregated from games in a real or virtual casino while the game, or a similar game, is being played. A game model can then be trained 320 based on the aggregated 315 game play information. The game model can represent the operation or progress of the virtual game while it is being played and results of execution of the virtual game;

An avatar 140 can be presented 325 in the virtual reality gaming environment such as the virtual casino 130. In some cases, the avatar can be generated and presented based on a set of player selections, predefined preferences, and/or preferences represented in the player model. Additional details of exemplary processes that can be performed in conjunction with presenting 325 the avatar will be described below with reference to FIG. 5.

Interactions 330 can then be conducted with the player 125 in the virtual reality gaming environment through the avatar 140, for example, while the player 125 is playing the virtual game. These interactions can be based on the player model and the game model. Additional details of exemplary processes which may be performed in conjunction with conducting these interactions will be described below with reference to FIG. 4.

Figure 4:
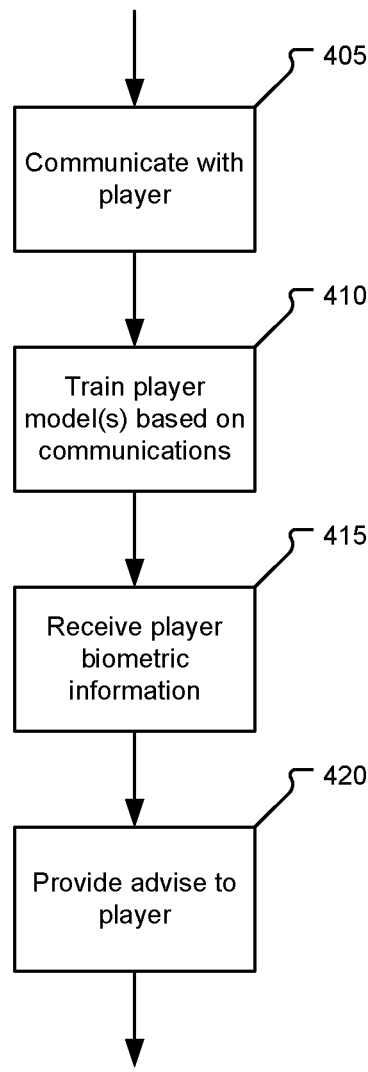
FIG. 4 is a flowchart illustrating additional details of an exemplary process for interacting with a player through an avatar according to one embodiment of the present disclosure.

FIG. 4 is a flowchart illustrating additional details of an exemplary process for interacting with a player through an avatar according to one embodiment of the present disclosure. As illustrated in this example, interacting with the player 125 in the virtual reality gaming environment or virtual casino 130 through the avatar 140 can comprise communicating 405 with the player, i.e., conducting a two-way communication with the player. This communication can comprise audio and/or textual natural language communications. For example, the two-way communication with the player can comprise asking the player a question and receiving a spoken and/or written natural language response. In such cases, the player model can be further trained 410 based on the interacting with the player 125 in the virtual reality gaming environment through the avatar 140, e.g., based on an answer to a question or other natural language statements received.

Optionally, and in some cases, player information comprising biometric information for the player can be received 415 while the player is playing the virtual game. The biometric information for the player can indicate an emotional state for the player. Such information can be received, for example, from a VR headset 115 of the player, a mobile device of the player, another wearable such as a smartwatch, for example, and/or in other ways. Such information can be used to determine, e.g., based on heartrate, respiration, perspiration, facial expressions, other posture and/or body language queues, etc., whether the player is excited, anxious, happy, frustrated, etc.

Interacting with the player in the virtual reality environment through the avatar can additionally, or alternatively comprise providing 420 advice to the player. For example, the advice to the player can comprise advice in the form of audio and/or textual natural language instructions or suggestions related to game strategy for the virtual game. Additionally, or alternatively, if biometric information for the player has been received, the advice to the player can comprise advice in the form of audio and/or textual natural language responsible gaming advice based on the indicated emotional state for the player.

Figure 5:
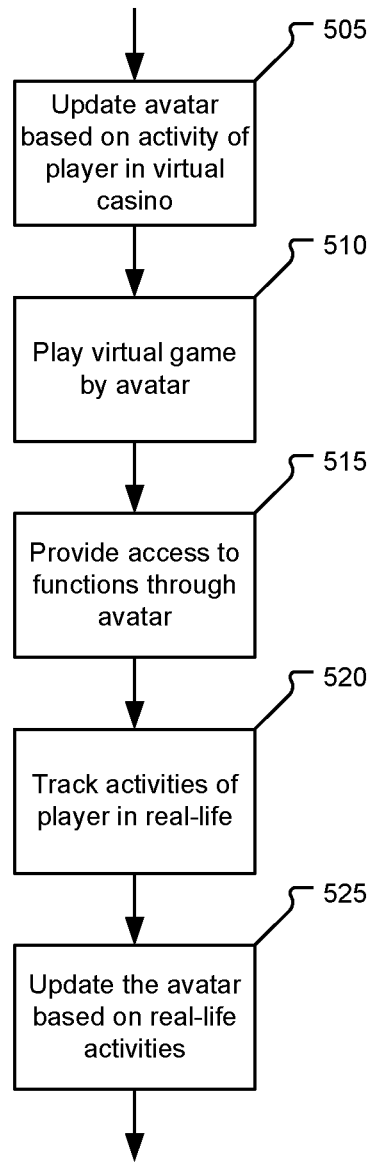
FIG. 5 is a flowchart illustrating additional details of an exemplary process for presenting an avatar in a virtual gaming environment according to one embodiment of the present disclosure.

FIG. 5 is a flowchart illustrating additional details of an exemplary process for presenting an avatar in a virtual gaming environment according to one embodiment of the present disclosure. In some cases, and as illustrated in this example, the avatar 140 can be updated 505 based on activity of the player 125 in the virtual casino 130. For example, the avatar 140 can receive skins or outfits, etc. In another example, the avatar can be updated 505 to have the appearance of a game character, particular person, e.g., famous person or influencer, etc. In yet another example of updating 505 an avatar, an indication can be provided as to whether the avatar represents a human player or automated process.

Additionally, or alternatively, presenting the avatar can comprise playing 510 the virtual game by the avatar based on the player model. That is, according to one embodiment, a user's avatar can play game(s) for the user in a virtual casino 130, for example, based on the player model, game model, parameters, and limits set up by the player. The avatar can represent an AI agent or bot that has been trained on the user's game play style, using the user's historical game play data as a training set. In some cases, the avatar can provide an autoplay strategy for the player and uses the player data and characteristics to build and execute the autoplay strategy. Additionally, or alternatively, the avatar can query the player during or after a play session to determine the players level of satisfaction or dissatisfaction and use this to enhance the player model and reward function.

Additionally, or alternatively, interacting with the player in the virtual reality gaming environment through the avatar can comprise providing 515 a plurality of functions through the avatar. For example, a player's avatar can be a fungible token that becomes a non-fungible token. In such an example, the player can collect "flair" from winning certain XTB (times total bet) amounts. In another example, the avatars can provide players with real in-game feelings through brain stimulation as described above.

In some cases, the VR system and or gaming system can track 520 activity of the player in real life and update 525 the avatar based on the activity of the player in real life. For example, a mobile device of the player can be used to can track day to day activities which then influences the progression and type of progression of an avatar or charm. For example, the types of activities tracked can include, but are not limited to, locations visited, activities occurring at those locations, browsing histories, etc.

A number of variations and modifications of the disclosure can be used. It would be possible to provide for some features of the disclosure without providing others.

The present disclosure contemplates a variety of different gaming systems each having one or more of a plurality of different features, attributes, or characteristics. A "gaming system" as used herein refers to various configurations of: (a) one or more central servers, central controllers, or remote hosts; (b) one or more electronic gaming machines such as those located on a casino floor; and/or (c) one or more personal gaming devices, such as desktop computers, laptop computers, tablet computers or computing devices, personal digital assistants, mobile phones, and other mobile computing devices. Moreover, an EGM as used herein refers to any suitable electronic gaming machine which enables a player to play a game (including but not limited to a game of chance, a game of skill, and/or a game of partial skill) to potentially win one or more awards, wherein the EGM comprises, but is not limited to: a slot machine, a video poker machine, a video lottery terminal, a terminal associated with an electronic table game, a video keno machine, a video bingo machine located on a casino floor, a sports betting terminal, or a kiosk, such as a sports betting kiosk.

In various embodiments, the gaming system of the present disclosure includes: (a) one or more electronic gaming machines in combination with one or more central servers, central controllers, or remote hosts; (b) one or more personal gaming devices in combination with one or more central servers, central controllers, or remote hosts; (c) one or more personal gaming devices in combination with one or more electronic gaming machines; (d) one or more personal gaming devices, one or more electronic gaming machines, and one or more central servers, central controllers, or remote hosts in combination with one another; (e) a single electronic gaming machine; (f) a plurality of electronic gaming machines in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity and unless specifically stated otherwise, "EGM" as used herein represents one EGM or a plurality of EGMs, "personal gaming device" as used herein represents one personal gaming device or a plurality of personal gaming devices, and "central server, central controller, or remote host" as used herein represents one central server, central controller, or remote host or a plurality of central servers, central controllers, or remote hosts.

As noted above, in various embodiments, the gaming system includes an EGM (or personal gaming device) in combination with a central server, central controller, or remote host. In such embodiments, the EGM (or personal gaming device) is configured to communicate with the central server, central controller, or remote host through a data network or remote communication link. In certain such embodiments, the EGM (or personal gaming device) is configured to communicate with another EGM (or personal gaming device) through the same data network or remote communication link or through a different data network or remote communication link. For example, the gaming system includes a plurality of EGMs that are each configured to communicate with a central server, central controller, or remote host through a data network.

In certain embodiments in which the gaming system includes an EGM (or personal gaming device) in combination with a central server, central controller, or remote host, the central server, central controller, or remote host is any suitable computing device (such as a server) that includes at least one processor and at least one memory device or data storage device. As further described herein, the EGM (or personal gaming device) includes at least one EGM (or personal gaming device) processor configured to transmit and receive data or signals representing events, messages, commands, or any other suitable information between the EGM (or personal gaming device) and the central server, central controller, or remote host. The at least one processor of that EGM (or personal gaming device) is configured to execute the events, messages, or commands represented by such data or signals in conjunction with the operation of the EGM (or personal gaming device). Moreover, the at least one processor of the central server, central controller, or remote host is configured to transmit and receive data or signals representing events, messages, commands, or any other suitable information between the central server, central controller, or remote host and the EGM (or personal gaming device). The at least one processor of the central server, central controller, or remote host is configured to execute the events, messages, or commands represented by such data or signals in conjunction with the operation of the central server, central controller, or remote host. One, more than one, or each of the functions of the central server, central controller, or remote host may be performed by the at least one processor of the EGM (or personal gaming device). Further, one, more than one, or each of the functions of the at least one processor of the EGM (or personal gaming device) may be performed by the at least one processor of the central server, central controller, or remote host.

In certain such embodiments, computerized instructions for controlling any games (such as any primary or base games and/or any secondary or bonus games) displayed by the EGM (or personal gaming device) are executed by the central server, central controller, or remote host. In such "thin client" embodiments, the central server, central controller, or remote host remotely controls any games (or other suitable interfaces) displayed by the EGM (or personal gaming device), and the EGM (or personal gaming device) is utilized to display such games (or suitable interfaces) and to receive one or more inputs or commands. In other such embodiments, computerized instructions for controlling any games displayed by the EGM (or personal gaming device) are communicated from the central server, central controller, or remote host to the EGM (or personal gaming device) and are stored in at least one memory device of the EGM (or personal gaming device). In such "thick client" embodiments, the at least one processor of the EGM (or personal gaming device) executes the computerized instructions to control any games (or other suitable interfaces) displayed by the EGM (or personal gaming device).

In various embodiments in which the gaming system includes a plurality of EGMs (or personal gaming devices), one or more of the EGMs (or personal gaming devices) are thin client EGMs (or personal gaming devices) and one or more of the EGMs (or personal gaming devices) are thick client EGMs (or personal gaming devices). In other embodiments in which the gaming system includes one or more EGMs (or personal gaming devices), certain functions of one or more of the EGMs (or personal gaming devices) are implemented in a thin client environment, and certain other functions of one or more of the EGMs (or personal gaming devices) are implemented in a thick client environment. In one such embodiment in which the gaming system includes an EGM (or personal gaming device) and a central server, central controller, or remote host, computerized instructions for controlling any primary or base games displayed by the EGM (or personal gaming device) are communicated from the central server, central controller, or remote host to the EGM (or personal gaming device) in a thick client configuration, and computerized instructions for controlling any secondary or bonus games or other functions displayed by the EGM (or personal gaming device) are executed by the central server, central controller, or remote host in a thin client configuration.

In certain embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include a local area network (LAN) in which the EGMs (or personal gaming devices) are located substantially proximate to one another and/or the central server, central controller, or remote host. In one example, the EGMs (or personal gaming devices) and the central server, central controller, or remote host are located in a gaming establishment or a portion of a gaming establishment.

In other embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include a wide area network (WAN) in which one or more of the EGMs (or personal gaming devices) are not necessarily located substantially proximate to another one of the EGMs (or personal gaming devices) and/or the central server, central controller, or remote host. For example, one or more of the EGMs (or personal gaming devices) are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs (or personal gaming devices) are located. In certain embodiments in which the communication network includes a WAN, the gaming system includes a central server, central controller, or remote host and an EGM (or personal gaming device) each located in a different gaming establishment in a same geographic area, such as a same city or a same state. Gaming systems in which the communication network includes a WAN are substantially identical to gaming systems in which the communication network includes a LAN, though the quantity of EGMs (or personal gaming devices) in such gaming systems may vary relative to one another.

In further embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include an internet (such as the Internet) or an intranet. In certain such embodiments, an Internet browser of the EGM (or personal gaming device) is usable to access an Internet game page from any location where an Internet connection is available. In one such embodiment, after the EGM (or personal gaming device) accesses the Internet game page, the central server, central controller, or remote host identifies a player before enabling that player to place any wagers on any plays of any wagering games. In one example, the central server, central controller, or remote host identifies the player by requiring a player account of the player to be logged into via an input of a unique player name and password combination assigned to the player. The central server, central controller, or remote host may, however, identify the player in any other suitable manner, such as by validating a player tracking identification number associated with the player; by reading a player tracking card or other smart card inserted into a card reader; by validating a unique player identification number associated with the player by the central server, central controller, or remote host; or by identifying the EGM (or personal gaming device), such as by identifying the MAC address or the IP address of the Internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the Internet browser of the EGM (or personal gaming device). Examples of implementations of Internet-based gaming are further described in U.S. Pat. No. 8,764,566, entitled "Internet Remote Game Server," and U.S. Pat. No. 8,147,334, entitled "Universal Game Server."

The central server, central controller, or remote host and the EGM (or personal gaming device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or personal gaming devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

As should be appreciated by one skilled in the art, aspects of the present disclosure have been illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (Saas).

Aspects of the present disclosure have been described herein with reference to flowchart illustrations and/or block diagrams of methods, apparatuses (systems) and computer program products according to embodiments of the disclosure. It should be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

What is claimed is:

1. A method for operating a virtual reality gaming environment, the method comprising:
   aggregating, by a processor of a virtual reality system, from a plurality of sources, player information for a player of a virtual game in the virtual reality gaming environment;
   training, by the processor of the virtual reality system, a player model based on the aggregated player information for the player, the player model representing preferences and behaviors for the player;

aggregating, by the processor of the virtual reality system, game play information for the virtual game;

training, by the processor of the virtual reality system, a game model based on the aggregated game play information, the game model representing results of execution of the virtual game;

presenting, by the processor of the virtual reality system, an avatar in the virtual reality gaming environment; and interacting, by the processor of the virtual reality system, with the player in the virtual reality gaming environment through the avatar based on the player model and the game model while the player is playing the virtual game.

2. The method of claim 1, wherein the plurality of sources comprises a gaming channel.

3. The method of claim 1, wherein the plurality of sources comprises a metaverse.

4. The method of claim 3, wherein the metaverse comprises a third-party metaverse.

5. The method of claim 1, wherein the avatar is based on a set of player selections.

6. The method of claim 1, wherein interacting with the player in the virtual reality gaming environment through the avatar comprises conducting a two-way communication with the player.

7. The method of claim 6, wherein the two-way communication with the player comprises asking the player a question.

8. The method of claim 1, further comprising training, by the processor of the virtual reality system, the player model based on the interacting with the player in the virtual reality gaming environment through the avatar.

9. A virtual reality system comprising:

a processor; and a memory coupled with and readable by the processor and storing therein a set of instructions which, when executed by the processor, causes the processor to:

aggregate, from a plurality of sources, player information for a player of a virtual game in the virtual reality gaming environment;

train a player model based on the aggregated player information for the player, the player model representing preferences and behaviors for the player;

aggregate game play information for the virtual game;

train a game model based on the aggregated game play information, the game model representing results of execution of the virtual game;

present an avatar in the virtual reality gaming environment; and interact with the player in the virtual reality gaming environment through the avatar based on the player model and the game model while the player is playing the virtual game.

10. The virtual reality system of claim 9, wherein interacting with the player in the virtual reality environment through the avatar comprises providing advice to the player.

11. The virtual reality system of claim 10, wherein the advice to the player comprises advice related to game strategy for the virtual game.

12. The virtual reality system of claim 10, wherein the player information comprises biometric information for the player while playing the virtual game.

13. The virtual reality system of claim 12, wherein the biometric information for the player indicates an emotional state for the player.

14. The virtual reality system of claim 13, wherein the advice to the player comprises responsible gaming advice based on the indicated emotional state for the player.

15. A gaming system comprising:

a processor; and a memory coupled with and readable by the processor and storing therein a set of instructions which, when executed by the processor, causes the processor to:

aggregate, from a plurality of sources, player information for a player of a virtual game in the virtual reality gaming environment;

train a player model based on the aggregated player information for the player, the player model representing preferences and behaviors for the player;

aggregate game play information for the virtual game;

train a game model based on the aggregated game play information, the game model representing results of execution of the virtual game;

present an avatar in the virtual reality gaming environment; and interact with the player in the virtual reality gaming environment through the avatar based on the player model and the game model while the player is playing the virtual game.

16. The gaming system of claim 15, wherein the instructions further cause the processor to update the avatar based on activity of the player in the virtual gaming environment.

17. The gaming system of claim 15, wherein presenting the avatar further comprises playing the virtual game by the avatar based on the player model.

18. The gaming system of claim 15, wherein the plurality of sources comprises a third-party platform and wherein the avatar comprises a cross-platform avatar.

19. The gaming system of claim 15, wherein interacting with the player in the virtual reality gaming environment through the avatar comprises providing a plurality of functions through the avatar.

20. The gaming system of claim 15, wherein the instructions further cause the gaming system to:

track activity of the player in real life; and update the avatar based on the activity of the player in real life.

* * * * *